Jan. 13, 1942.   R. BECHTLE ET AL   2,269,643
CUTTING MACHINE
Filed March 14, 1941   2 Sheets-Sheet 1
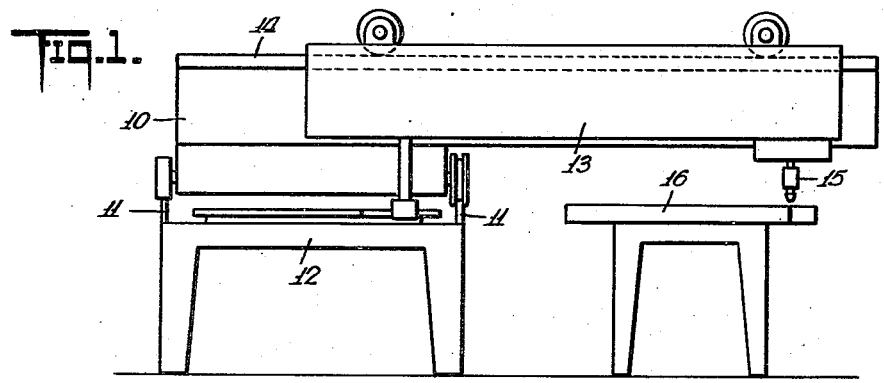
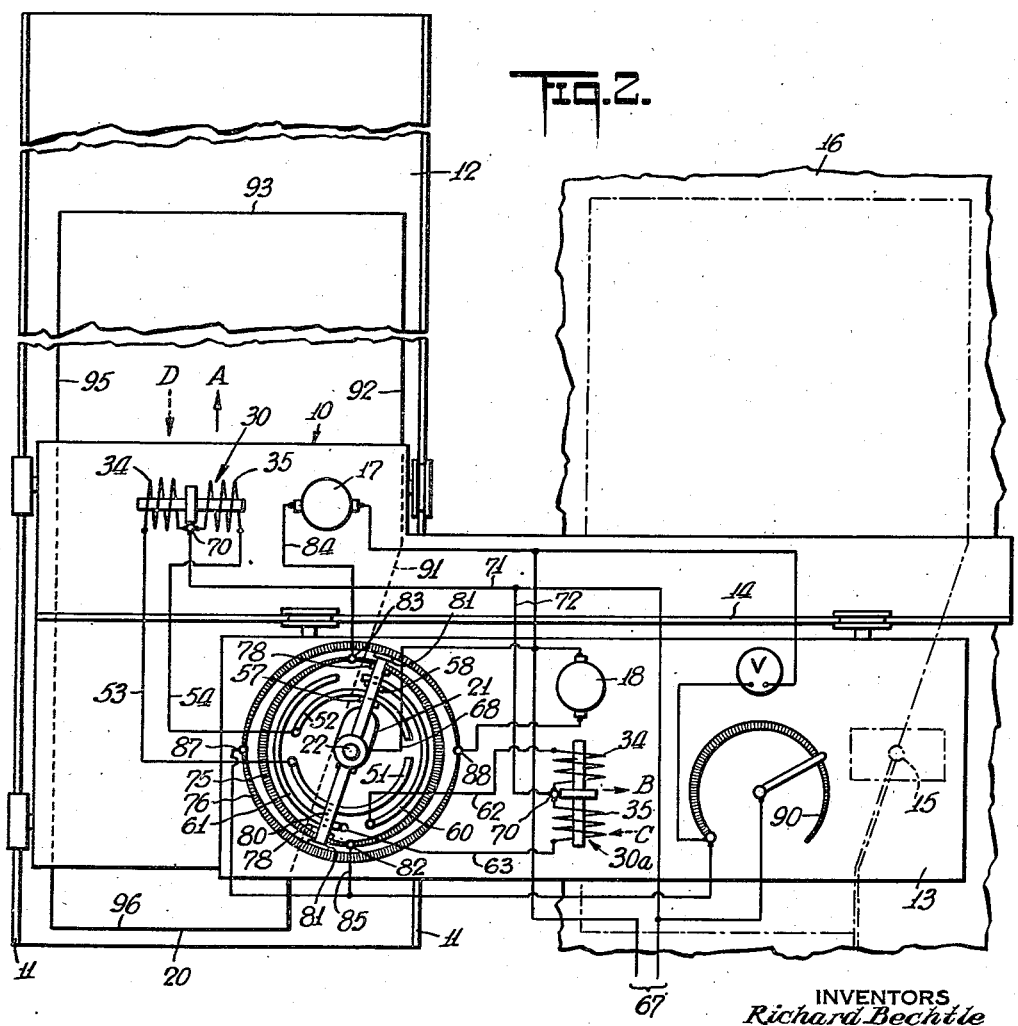
INVENTORS
Richard Bechtle
Erich Habermehl
BY
Dean Fairbank & Hersch
ATTORNEYS Jan. 13, 1942.   R. BECHTLE ET AL   2,269,643
CUTTING MACHINE
Filed March 14, 1941   2 Sheets-Sheet 2
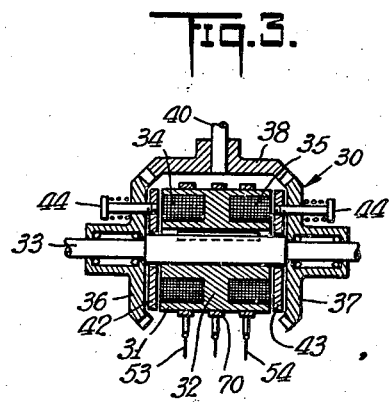
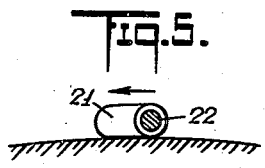
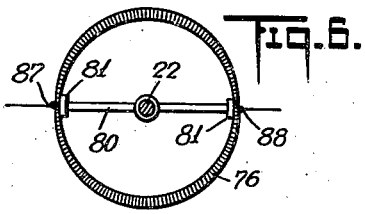
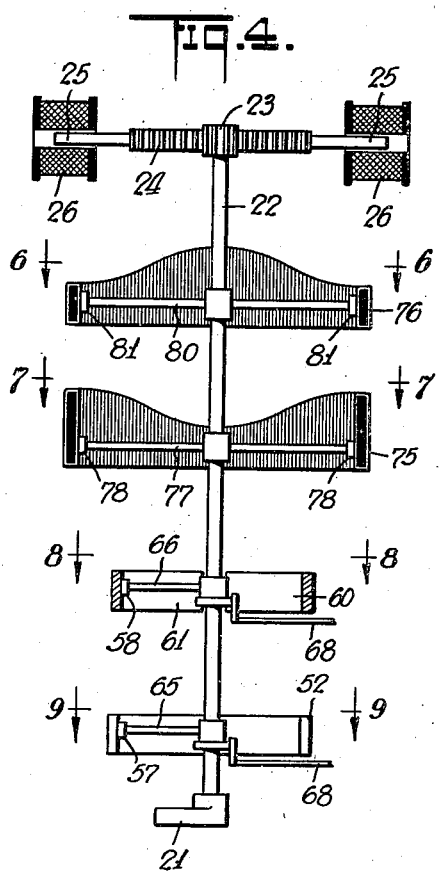
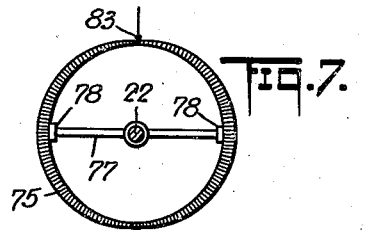
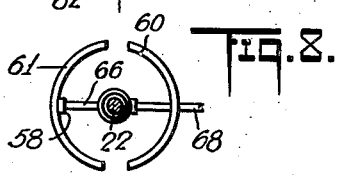
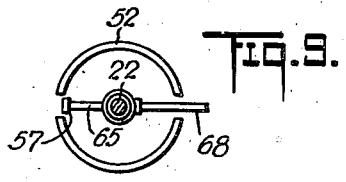
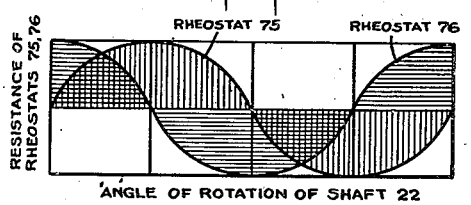
INVENTORS
Richard Bechtle
Erich Habermehl
BY
ATTORNEYS Patented Jan. 13, 1942

2,269,643

UNITED STATES PATENT OFFICE 2,269,643

CUTTING MACHINE

Richard Bechtle and Erich Habermehl, Frankfort-on-the-Main, Germany, assignors to Messer & Co. G. m. b. H., Frankfort-on-the-Main, Germany, a company of Germany Application March 14, 1941, Serial No. 383,332
In Germany November 24, 1938

8 Claims. (Cl. 266—23)

To meet modern industrial requirements, an oxyacetylene cutting machine must produce clean cuts, be accurate in operation, be rugged and sturdy, and capable of operating with simple templets, be easily operated when using a drawing or the like, and must lend itself efficiently to operation for mass production.

Especially in those types of machines where the arm is comparatively long and where the cuts are accordingly long, the known constructions are not sufficient to make clean accurate cuts, and to meet the other necessary requirements. In order to produce a clean and accurate cut, the machine must be absolutely free from vibration during operations. However, in order to obviate such vibrations, the machine must be of heavy solid construction. For automatically driven machines where the driving power depends on the size of the motor, the weight of the machine generally plays only a secondary part. However, cutting machines fitted with simple templets must be light in many cases, in order to enable the traction power at the templet to advance the machine. Any slight divergence of the tracing member from a straight line or plane, or any slight jamming or the like as said member rides along the guide surface affects the sharpness and the accuracy of the cut made.

In one form of known construction for cutting large work pieces by the use of templets, a small knurled roller is used, which is held by electromagnetic power against the edge of a simple iron templet, and which is propelled along said edge, this templet being geometrically similar to the work to be cut out, except for the allowances made for the diameter of the roller and the width of the cut. The movement of this roller is directly transferred to the driving mechanism of the machine, without the use of any means for fortifying the traction power, which depends exclusively on the friction between the roller and the templet. Even if the electro-magnetic power acting on the roller is increased, the traction power of the roller is not increased much, because the friction between the roller and the templet cannot be arbitrarily increased. Therefore, when the machine is hampered in its movement, or when the heavy machine has to be speeded up, the roller may stop at any point of the templet, where it will operate as a milling tool. Therefore, when using simple magnetic templets, the requirement for a solid heavy machine free from vibration on the one hand, and the requirement for easy mobility of the machine on the other hand are contradictory. Attempts have been made to overcome this difficulty by compromising and sacrificing some of these requirements, but thas has not satisfactorily solved the problem.

When operating without a templet and by the use of a drawing or by following the lines laid out on the work itself, the machine is usually driven by a tracer wheel, which is propelled against a Cellophane or steel plate. The width of the periphery of the tracer wheel has to be very narrow, since it has to accurately follow straight lines. Consequently, this periphery is apt to be quickly worn off when used in connection with steel plates, and when used on Cellophane plates will quickly destroy said plates. Therefore, with such a machine, due to the fact that the tracer wheel has to carry a certain pressure which is increased with the increasing weight of the machine, it is impossible to avoid inaccuracies in the guiding of the machine, especially around corners and along curved lines.

There are known machines, which are driven by several motors, so that straight or circular lines can be cut by means of various clutches or by switching in one or more of these motors. However, in such machines the speeds are subject to variations when changing over from a simple to a compound movement, so that these speeds have to be readjusted. This disadvantage is very serious, and for accurate practical requirements cannot be tolerated. Recent tests have shown that variations in the cutting speed of more than plus or minus 10% as compared with a predetermined adjusted speed produces an imperfect cut from the standpoint of modern industrial requirements.

One object of the present invention is to provide a new and improved apparatus of the general type referred to, in which all of the aforementioned deficiencies are eliminated.

In carrying out the present invention, the cutting machine, which is of the cross-carriage type, is provided with a separate and separately regulated drive for each carriage. For cutting out spherical curves, the machine may be provided, in addition to the horizontally movable carriages, with a third carriage for the third dimensional operation of the cutter, this third carriage being desirably arranged vertically with respect to the plane of the other two carriages. The drive may be controlled by mechanically or hydraulically working gears, either separately or combined from a common power source. Also, the same effect can be obtained by the use of electrically controlled motors. By any combination of the various speeds, the cutting torch may be advanced in any direction.

As a feature of the present invention, the controls of the separate driving means are effected automatically in such a way that the speed of the cutting torch resulting from the composite speeds of the different carriages is constant.

Various other objects, features and advantages of the invention will be apparent from the following particular description, and from an inspection of the accompanying drawings, in which:

Fig. 1 is a side elevation somewhat diagrammatic of an oxy-acetylene cutting machine embodying the present invention, Fig. 2 is a top plan view of the machine somewhat diagrammatic, and showing the wiring diagram for the various electric units of the machine, Fig. 3 is a section showing one of the electromagnetic reversing couplings forming part of the cutting machine of the present invention, Fig. 4 is a diagrammatic view partly in side elevation and partly in vertical section of various control elements of the machine, Fig. 5 is a diagrammatic view showing the operation of a tracer member with respect to a templet or guide surface, Figs. 6, 7, 8 and 9 are diagrammatic end views of various electrical control units of the machine, and Fig. 10 is a curve showing the relative variations in the resistances of the rheostats forming part of the control means of the present invention.

The control mechanism of the present invention is shown applied to a flame cutting apparatus, in which a carriage 10, movable along tracks 11 on a bed 12, supports a torch carrying carriage 13, movable along a track 14 on the carriage 10 in a direction at right angles to the direction of movement of said carriage 10. The two cross-carriages 10 and 13 are driven along their respective tracks at controlled speeds by means of separate power means shown in the form of motors 17 and 18 respectively, so that the desired universal cutting movement of a torch or blowpipe 15 over a workpiece 16 is obtained.

Supported on the machine bed 12 is a guide layout shown in the form of a templet 20, having an outline corresponding to the outline of the workpiece 16 to be cut. This templet outline is traced by means of a tracing member 21 connected to the lower end of a vertical control shaft 22, to cause corresponding movement of the torch 15 over the workpiece. To hold the tracing member 21 against the templet 20 during its tracing movement, the upper end of the control shaft 22 carries a pinion 23 meshing with a rack 24 having plunger ends 25 extending respectively into the magnetic fields of a pair of opposed solenoids 26. By means of a press button control accessible on the machine, either one of the solenoids 26 may be energized in accordance with the desired direction of movement of the tracing member 21 along the periphery of the templet 20 to move the rack 24 longitudinally in either direction. This will rotate the pinion 23, and in turn will cause the tracing member 21 to rotate into tangential engagement with the periphery of the templet as shown in Fig. 5. The tracing member 21 will be retained in tangential position during the tracing movement thereof.

Instead of a rack and pinion for rotating the tracing member 21 into tracing engagement with the templet, springs or other suitable means may be used for the purpose.

The tracing member 21 may be of any suitable construction. For instance, it may be in the form shown in the drawings or may comprise two rollers seated on a traverse fixed to the control shaft 22.

As the tracing member 21 follows the periphery of the templet 20, it is rotated in accordance with the contour of this periphery to cause corresponding rotation of the control shaft 22. The rotative position of this control shaft 22 automatically determines the speed and direction of the two motors 17 and 18.

To control the direction of rotation of the motors 17 and 18, the transmissions between said motors and their corresponding traction wheels include respectively electromagnetic reversing couplings 30 and 30a. In the form shown in Fig. 3, each of these couplings comprises an electromagnet 31 having a magnetizable core 32 keyed to a driven or output shaft 33 for rotation therewith, and carrying two opposed coils 34 and 35 to form two electro-magnetic parts at opposite ends thereof. At opposite ends of the magnet 31, and freely rotatable on the driven shaft 33 are two bevel gears 36 and 37, meshing with a bevel gear 38, which is fixed to an input or drive shaft 40, driven from the corresponding motor.

Between the bevelled gears 36 and the adjacent end of the electro-magnet 31 in an armature coupling plate 42 of magnetizable material such as soft iron, slidably mounted on the shaft 33, and between the bevelled gear 37 and the other end of the electro-magnet 31 is a similar slidable armature coupling plate 43. These coupling plates 42 and 43 are secured to the beveled gears 36 and 37 respectively for rotation therewith by means of rods 44, affixed to said plates and passing loosely through the corresponding bevelled gears 36 and 37. Three of such rods 44 equally spaced circumferentially are desirably provided for each coupling plate, and are desirably spring-pressed to urge said plates axially away from the adjacent pole ends of the magnet 32.

In the operation of the electro-magnetic reversing coupling, when for instance the coil 34 is energized, the coupling plate 42 will be magnetically attracted into coupling engagement with the adjacent pole face of the magnet 31, so that the bevelled gear 36 will be coupled for rotation with said magnet. In this position of the coupling plate 42, the drive from the motor 17 or 18 to the shaft 33 will be through the bevelled gears 38 and 36 to the shaft 33, while the coil 35 is de-energized and the bevelled gear 37 rotates loosely about shaft 33.

When the current is switched over to energize the coil 35 and deenergize the coil 34, then the plate 43 will be attracted into coupling engagement with the adjacent pole end of the magnet 31 to reverse the rotation of the shaft 33 by the drive through the gears 38 and 37.

For controlling the operation of the electromagnetic reversing couplings 30 and 30a in accordance with the rotative position of the control shaft 22, a pair of reversing switches is provided for said couplings respectively. The reversing switch for the coupling 30 comprises a circular contact ring concentrically encircling the control shaft 22, and split into two sections 51 and 52 (diametrically along a plane at right angles to the direction of movement of the carriage 10. These ring sections 51 and 52 are connected in series with the coils 34 and 35 respectively of coupling 30 through leads 53 and 54.

The reversing switch for coupling 30a comprises a circular contact ring concentrically encircling the control shaft 22, and split into two sections 60 and 61 diametrically along a plane spaced 90° from the split of the other ring 51, 52. These ring sections 60 and 61 are connected in series with the coils respectively of coupling 30a through leads 62 and 63.

Secured to the control shaft 22 are a pair of vertically aligned radial conductor arms 65 and 66, carrying at their outer ends respectively brushes 57 and 58, riding in electrical contact over the inner peripheries of respective contact rings. These arms 65 and 66 are electrically connected to one side of the power line 67 through leads 68, the other side of said power line being connected to the common terminal 70 of the coils of the reversing couplings 30 and 30a by branch leads 71 and 72.

With this electrical tie-up, the two coils 34 and 35 of each reversing coupling with associated ring sections are connected in parallel, and the circuits of the two reversing couplings 30 and 30a including their respective reversing switches are connected together in parallel.

For controlling the speeds of the two carriages 10 and 13, there is provided in the electric circuits of the motors 17 and 18 respectively a pair of circular rheostats 75 and 76, concentrically encircling the control shaft 22. Secured to the control shaft 22 is a diametrically extending conductor or contact arm 77, having brushes 78 at its outer ends in electrical contact with the coils of the rheostat 75, and a diametrical conductor arm 80 carrying at its ends brushes 81 in electrical contact with the coils of the rheostat 76.

The rheostat 75 which controls the speed of the motor 17 has two terminals 82 and 83, at diametrically opposed sections in a plane substantially parallel to the direction of movement of the carriage 10, and the resistance of the coils of this rheostat vary from a minimum at these terminal points to a maximum at 90° therefrom. The terminal 83 is connected to one side of the motor 17 by a lead 84, while the terminal 82 is connected to one side of the power line 67 by the lead 85.

The rheostat 76 which controls the speed of the motor 18 has at diametrically opposite sections thereof terminals 87 and 88, spaced 90° from the terminal points 82 and 83 of the other rheostat 75. This rheostat is constructed to vary from a minimum at the terminal points to a maximum at 90° therefrom.

The two rheostats 75 and 76 are mounted in series with their respective motors 17 and 18, and the circuits of these motors are connected in parallel. In order to predetermine the maximum speed of either motor, there is provided a main rheostat 90 in the circuits of these motors.

The sliding contact arms 77 and 80 for the rheostats 75 and 76 respectively are in vertical alignment with the conductor arms 65 and 66 controlling the reversing switches of the motors 17 and 18.

The two rheostats 75 and 76 are so constructed and so positioned relatively, that the resistance from one of said rheostats cut into its respective motor circuit by its corresponding contact arm is subject to sinusoidal variations as said contact arm rotates, while the resistance of the other rheostat cut into the other motor circuit by its corresponding contact arm is automatically subjected to cosinusoidal variations as shown in Fig. 10.

The amount of resistance from the rheostats 75 and 76 cut into the respective motor circuits by the sliding contact arms 77 and 80 depends on the rotative position of the control shaft 22, as determined by the direction and shape of the templet edge with which the tracing member 21 is in tracing contact.

Since resistances from the rheostats 75 and 76 cut into their respective motor circuits bear sine and cosine relationship, the speeds of these motors will also bear the relationship of sine and cosine, and the carriages 10 and 13 will have a corresponding speed relationship.

Since the speed of the cutting torch 15 is the hypothenuse resultant of the speeds of the two carriages 10 and 13, and since $\sin^2 x + \cos^2 x = 1$, the resultant speed of said cutting torch will be constant.

In the operation of the cutting machine described, assuming that the tracing member 21 is riding along the inclined edge 91 of the templet 20 in the position shown in Fig. 2, the brush 57 will be in electrical contact with the reversing switch section 52, so that the coil 35 of the reversing coupling 30 will be energized and the transmission through said coupling will be through the gears 38, 37, to drive the carriage 10 in the direction A. At the same time, with the brush 58 in electrical contact with the reversing switch section 60, the coil 34 of the reversing coupling 30a will be energized, so that the carriage 13 will be driven in the direction B.

At the same time, the parts of the rheostat 75 between its terminals 82 and 83 and the nearest brushes 78 respectively will be in the circuit of the motor 17, while the parts of the rheostat 76 between its terminals 87 and 88 and the nearest brushes 81 respectively will be in the circuit of the motor 18, so that the speeds of the two motors will have a relationship of sine and cosine depending on the angle of rotation of the control shaft 22. The combined movement of the two carriages 10 and 13 will cause the resultant movement of the torch 15 at a constant speed.

Assuming that the tracing member 21 is following along the templet edge 92 parallel to the direction of movement of the carriage 10, the brush 57 will still be in contact with the reversing switch section 52, so that the carriage 10 will still be moving in the direction A. However, the brush 58 will be disposed in the gap between the two reversing switch sections 60 and 61, so that the circuit of the two coils 34 and 35 of the reversing coupling 30a will be open, and the transmission between the motor 18 and the traction wheels of the carriage 13 will be interrupted.

While the tracing member is travelling along the templet edge 92, the brushes 78 will be in contact with the terminals 82 and 83, so that no resistance from the rheostat 75 is cut into the circuit of the motor 17, and the motor 17 will rotate at the maximum speed predetermined by the setting of the main rheostat 90. At the same time, the brushes 81 being disposed centrally between the terminals 87 and 88 of the rheostat 76 will cut into the circuit of the motor 18 the maximum amount of resistance, so that the motor 18 is either stationary or idling very slowly.

Therefore, during the tracing movement of the member 21 along the templet edge 92, the speed of the torch 15 will be constant and equal to the speed it had while said member 21 was travelling along the templet edge 91.

When the tracing member 21 moves into engagement with a templet edge 93 parallel to the direction of movement of the carriage 13, the brush 57 will be in the gap between the two reversing switch sections 51 and 52, so that the circuits of both of the coils 35 and 35 of the reversing couplings 30 are open, and the transmission between the motor 17 and its corresponding traction wheels is interrupted. At the same time, the brush 58 will have moved into electrical contact with the reversing switch section 61, so that the coil 34 of the reversing coupling is de-energized and the coil 35 energized to drive the carriage 13 in the direction of the dotted arrow C.

At the same time, the brushes 78 will be disposed midway between the terminals 82 and 83, so that the maximum resistance of the rheostat 75 is cut into the circuit of the motor 17, and said motor is either stationary or driving at slow idling speed. The brushes 81 will be in contact with the terminals 87 and 88, so that the rheostat 76 is cut out of the circuit of the motor 18, causing said motor to rotate at a maximum speed as determined by the setting of the main rheostat 90.

When the tracing member 21 is following along the templet edge 95 parallel to the direction of movement of the carriage 10, the brush 58 will extend in the gap between the two ring sections 60 and 61, so that the carriage 13 is stationary. The brush 57 in contact with the ring section 51 will energize coil 34 of coupling 30, so that movement of carriage 10 is in the direction of dotted arrow D. The brushes 78 in contact with the terminals 82 and 83 will short circuit the rheostat 75, so that the motor 17 is rotating at maximum speed.

Operation of the machine while the tracing member 21 engages templet edge 96 is apparent from the foregoing description.

It is seen that as a result of the construction described, when operating with only one motor drive causing movement only of the corresponding carriage, the tool 15 will move at a constant pre-adjusted speed, and when operating with two motor drives causing simultaneous advancement of the two carriages, the speeds of said drives are so modified that the tool 15 will travel at said pre-adjusted speed.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent is:

1. A machine for operating a tool comprising a first carriage guided for straight line movement only in one direction, a tool carrying carriage supported for movement with said first carriage in said direction and movable relatively thereto only in a crosswise straight line direction, an electric motor for driving each of said carriages, a rheostat of the ohmic resistance type for controlling the speed of each of said motors, and means for automatically varying the resistance of said rheostats to a predetermined resultant value, and in accordance with the direction of movement of said tool to move said tool at a constant predetermined speed.

2. A machine of the class described comprising a first carriage guided for straight line movement only in one direction, a second carriage supported for movement with said first carriage in said direction and movable relatively thereto only in a crosswise straight line direction, a tool carried by said second carriage, a drive for each of said carriages, a tracing member adapted to be guided along a guide layout and movable in unison with said tool, a control shaft rotatable by the guiding movement of said tracing member over said layout, and means automatically operable in accordance with the rotation of said control shaft for automatically controlling the speeds of said drives to a predetermined resultant value to move said tool at a predetermined constant speed.

3. A machine of the class described comprising a first carriage guided for straight line movement only in one direction, a second carriage supported for movement with said first carriage in said direction and movable relatively with respect thereto only in a crosswise straight line direction, a tool carried by said second carriage, a drive for each of said carriages, a tracing member having a rotatable element adapted to be guided along a guide edge and bodily movable in unison with said tool, said element being rotatable according to the direction of said guide edge, and means determined by the rotative position of said element for automatically controlling the speeds of said drives to a predetermined resultant value and for controlling the direction of movement of said carriages.

4. A machine of the class described comprising a first carriage guide for movement only in one straight line direction, a second carriage supported for movement with said first carriage in said direction and movable relatively thereto only in a crosswise straight line direction, a tool carried by said second carriage, electric motors for driving said carriages respectively, a tracing member for controlling the movement of said tool and movable in unison with said tool, and means for moving said tool at a constant predetermined speed irrespective of the direction of movement of said tracing member, and including a control shaft operated from said tracing member, a circular rheostat concentrically mounted with respect to said control shaft for controlling the speed of each of said motors, and a pair of arms connected to said shaft for rotation therewith, and having slide electrical contact with said rheostats respectively.

5. A cutting machine of the class described comprising a first carriage guided for movement only in one straight line direction, a second carriage supported for movement with said first carriage in said direction and movable relatively thereto only in a crosswise straight line direction, a cutting tool mounted on said second carriage, electric motors for driving said carriages respectively, and means for controlling the speeds of said motors to move said tool at a predetermined constant speed, and including a circular rheostat in the circuit of each motor, and a sliding contact arm cooperating with each rheostat, and means for reversing the direction of movement of said carriages when said contact arm is moved 90°.

6. A machine of the class described comprising a first carriage guided for movement only in one straight line direction, a second carriage supported for movement with said first carriage in said direction and movable relatively with respect thereto only in a crosswise straight line direction, a tool carried by said second carriage, a tracing member for guiding the movement of said tool adapted to slide over the periphery of a templet, and constructed to follow the direction of the tangent of the peripheral contour of said templet, electric motors for driving said carriages respectively, rheostats controlling the speeds of said electric motors respectively, and means operated automatically in accordance with the tangential position of said tracing member as determined by the templet contour for modifying the resistances of said rheostats in the relationship of sine and cosine, whereby the speed of said motors is correspondingly changed and said tool is moved at a predetermined constant speed.

7. A flame cutting machine comprising a first carriage movable only in a straight line direction, a second carriage supported for movement with said first carriage in said direction and movable with respect thereto only in a crosswise straight line direction, a cutting torch supported on said crosswise movable carriage, electric motors for driving said carriages respectively, rheostats controlling the speeds of said electric motors respectively, and means for modifying the resistances of said rheostats in the relationship of sine and cosine, whereby the speed of said motors is correspondingly changed and said tool is moved at a predetermined constant speed.

8. A flame cutting machine comprising a first carriage movable only in a straight line direction, a second carriage supported for movement with said first carriage in said direction and movable with respect thereto only in a crosswise straight line direction, a cutting torch carried by said crosswise movable carriage, a tracing member adapted to ride in tangential tracing relationship with respect to the guide surface of a templet, and movable in unison with said torch, an electric motor for driving each of said carriages, a pair of rheostats controlling the speed of said motors respectively, a pair of reversing switches determining the direction of movement of said carriages respectively, and contact means slidably operating on said rheostats and said switches in accordance with the tangential tracing direction of said tracing member, for controlling said motors to speeds bearing sine and cosine relationship, and for simultaneously controlling the direction of movement of the respective carriages.

RICHARD BECHTLE.
ERICH HABERMEHL.